May 30, 1950 — J. CLARK — 2,509,210
EQUIPMENT FOR MEASURING PULSATING AND STEADY PRESSURE
Original Filed July 14, 1945 — 2 Sheets-Sheet 1

EVACUATED

AMPLIFIER — INTEGRATOR — OSCILLOGRAPH

INVENTOR.
JAMES CLARK
BY Wade Koontz AND
Frederick W. Cotterman
ATTORNEYS

May 30, 1950 J. CLARK 2,509,210
EQUIPMENT FOR MEASURING PULSATING
AND STEADY PRESSURE
Original Filed July 14, 1945 2 Sheets-Sheet 2
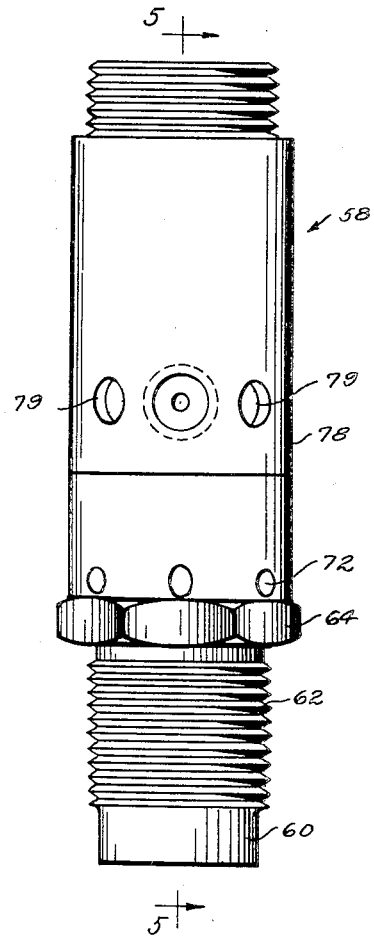
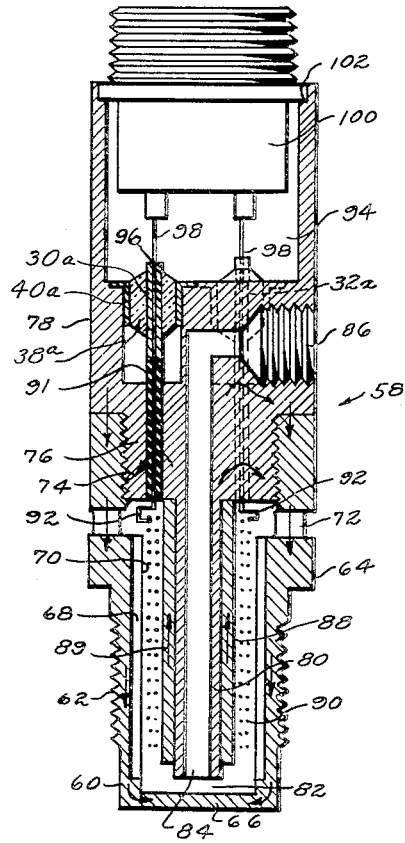
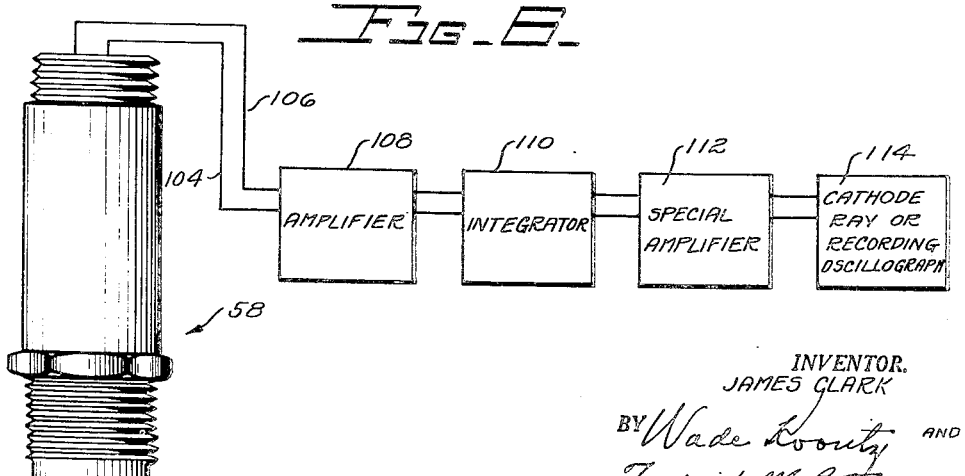
INVENTOR.
JAMES CLARK Patented May 30, 1950

2,509,210

UNITED STATES PATENT OFFICE 2,509,210

EQUIPMENT FOR MEASURING PULSATING AND STEADY PRESSURE

James Clark, Dayton, Ohio

Original application July 14, 1945, Serial No. 605,175. Divided and this application May 19, 1947, Serial No. 749,074

13 Claims. (Cl. 171—209)

(Granted under the act of March 3, 1883, as amended April 30, 1928; 370 O. G. 757)

The invention described herein may be manufactured and used by or for the Government for governmental purposes without payment to me of any royalty thereon.

This invention is a division of my copending application Serial No. 605,175, filed July 14, 1945; and relates to a pressure measuring system and more particularly to equipment for measuring pulsating pressures by electronic means.

It has been proposed to measure pulsating pressures by using pressure responsive diaphragms connected to sensitive carbon pile resistances whose output was recorded by an oscillograph. It was found, however, that where there is any appreciable diaphragm movement, the carbon granules tend to separate from each other, thus giving poor contact which has a nonlinear resistance characteristic, or they may pack together and refuse to follow the diaphragm pulsations. Moreover, upon repeated loading and unloading of the carbon granules which are in contact, the resulting abrasive action tends to pulverize them, whereby the clearance between the granules or carbon pile is continually raised.

The carbon pile devices above described are substantially an adaptation of the carbon button microphone which is used mainly where accurate response may be sacrificed for high output, as in throat microphones presently used by aircraft pilots.

Where optical systems with mirrors cemented to the pressure responsive diaphragm have been tried, the response to the device is so small for the pressure differentials being measured, that an elaborate optical system is required. The result is that, in most applications, the vibration of the component parts in the optical system causes a greater error than the response of the optical system to the movement of the pressure responsive diaphragm.

"A sylphon" with mirrors attached has been substituted for the flat diaphragm, but while it provided a greater deflection, the spring rate is so low that the resonant frequency is only from 10 to 20 cycles per second, which is entirely too low to measure the usual pulsating pressures encountered in aerodynamic and hydrodynamic flows. Moreover, the use of a "sylphon" in this situation is further limited because it expands and contracts with temperature changes which shifts the zero reference, whereby in wind tunnel and flight work the absolute value of the pressure differential is never certain since there is always a considerable temperature change with time in the wind tunnel and with altitude in flight work.

It is therefore an object of this invention to provide a device of the general character hereinbefore described but so constructed and arranged that it will accurately follow a pulsating pressure and will give a true value of the dynamic components of a pressure differential without shifting the zero reference in response to temperature changes.

It is a further object of the invention to provide a device of the character above described which is operated by electronic means but which requires no outside source of electric current supply.

Other objects and advantages will become evident as the invention is described in greater detail, reference being had to the drawings, wherein:

Fig. 4 is an elevation of a form of my invention adapted for picking up high frequency pulsating pressures such as occur in the combustion chamber of an internal combustion engine.

Fig. 5 is an axial section, taken at 5—5 of Fig. 4, showing the interior construction thereof.

Fig. 6 is a diagram of modified associated equipment which may be used with the devices of Figs. 1, 2, 4 and 5.

Like reference characters refer to like parts throughout the several views.

The direction of stress and consequently strain in any circular diaphragm clamped at the edge and uniformly loaded follows radial lines from the center of the diaphragm outward and becomes a maximum at a position adjacent the clamped edge. The equation for strain at the clamped edge of the diaphragm is:

$$\theta = \frac{3qr^2}{4h^2 E}$$

wherein $\theta$ = unit strain,
$q$ = distributed load/unit area,
$r$ = radius of free diaphragm,
$h$ = thickness of diaphragm,
$E$ = modulus of elasticity.

In order to design the most effective type of pickup unit for any purpose it is necessary to know the deflection at the center of the diaphragm for various loads. This may be expressed by the equation:

$$\delta = \frac{qr^4(1-\mu^2)}{5.33Eh^3}$$

wherein $\delta$=deflection at center of diaphragm,
$q$=pressure per unit area of diaphragm,
$r$=radius of free diaphragm,
$\mu$=Poisson's ratio.

Figure 1:
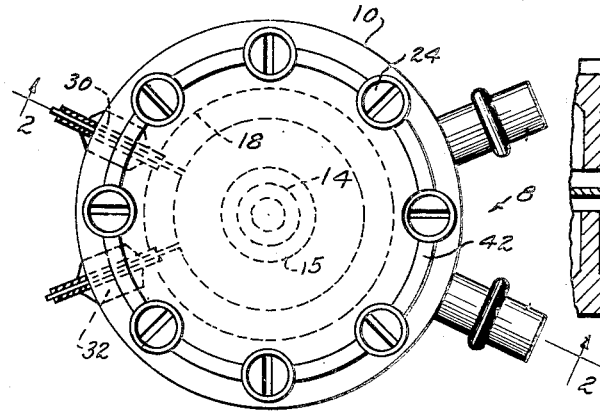
Fig. 1 is a top plan view of a pressure sensitive device which embodies the principles of my invention.
Figure 7:
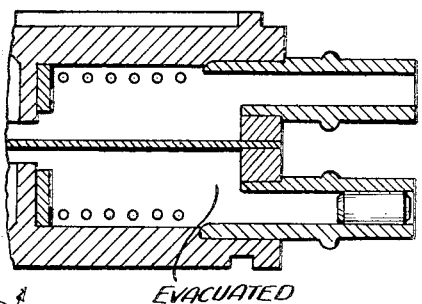
Fig. 7 is a fragmentary section of the pressure sensitive device shown in Fig. 2.
Figure 2:
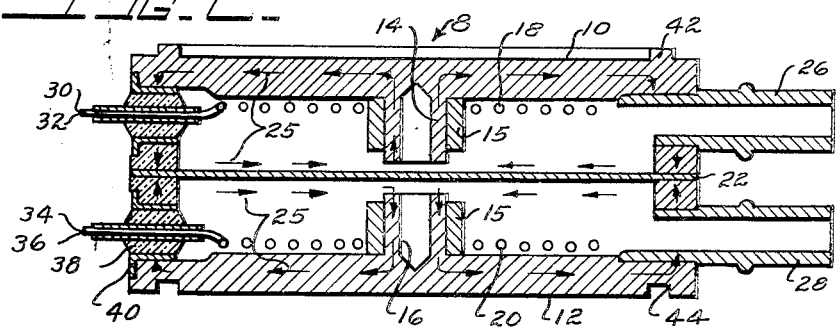
Fig. 2 is an axial section taken through Fig. 1 at 2—2 showing the interior construction to a somewhat larger scale than Fig. 1.
Figure 3:
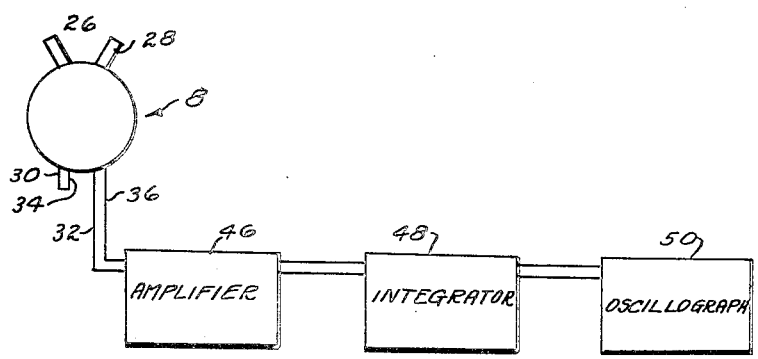
Fig. 3 is a diagram of associated equipment which may be used with the device of Figs. 1 and 2 or with the device of Figs. 4 and 5.

Reference is made to Figs. 1, 2 and 3 which show a pressure sensitive capsule 8, the operation of which is based on the inductance principle. Parts 10 and 12 together form a housing and at the same time serve as the magnetic elements of the device, having pole pieces 14 and 16 which are provided with permanent magnets 15 in the form of collars and A.-C. pickup coils 18 and 20, whereby the need for an outside power source for energizing the windings is eliminated.

A diaphragm 22 is clamped pressure tight at its outer edges between housing parts 10 and 12 by a circular row of screws 24. The joints between the body portions and the diaphragm should be very carefully fitted for the reason that these joints must not only insure against leakage of the reference pressure and the pressure which is to be measured, but must add a minimum of reluctance to the magnetic circuit. The collars 15 are magnetized with like poles adjacent the diaphragm whereby the flux divides and flows in the direction of the arrows 25. Pressure tube connections 26 and 28 are provided, one for each of the two chambers into which the diaphragm divides the interior of the housing. Either of the tube connections may be used to admit a reference pressure to the space on one side of the diaphragm and the other tube connection then used to admit the pulsating pressure which is to be measured, to the other side of the diaphragm.

Four winding terminals are provided, circumferentially spaced terminals 30 and 32 extending from the space on one side of the diaphragm and circumferentially spaced terminals 34 and 36 extending from the space on the other side of the diaphragm. The terminals 30, 32, 34 and 36 are preferably made of "Kovar" alloy tubing fitted into glass sleeves 38. The glass sleeves 38 are fitted into flanged bushings 40 also of "Kovar" alloy, the "Kovar" tubular terminals, the glass sleeves and the "Kovar" flanged bushings being fused together. The "Kovar" alloy tubular terminals and "Kovar" bushings and the glass sleeves having the same co-efficient of expansion are readily adapted to this procedure.

The tubular terminals 30, 32, 34 and 36 and the bushings 40 are copper plated and tinned, bushings 40 being soldered into the housing parts thus providing a pressure tight seal for the terminals. Opposite ends of the coil 18 are threaded through the terminals 30 and 32 from the inside. Opposite ends of the coil 20 are threaded through the terminals 34 and 36 also from the inside. The coil ends are then soldered to the tubular bushings 30, 32, 34 and 36 on the outside where they are most accessible. The reason for locating the electrical terminals as well as the pressure tube connections on the circumference of the housing instead of on the end walls is so that a number of the capsules may be stacked, one upon the other where a plurality of capsules are to be used.

Housing portion 10 is provided with an annular rib 42 and housing portion 12 with a mating annular groove 44, so that a number of pressure capsules will be in axial alignment when stacked one upon the other. The pitch diameter of the annular rib 42 coincides with the bolt circle of the screws 24, so that any force exerted in clamping together a stack of the capsules will not disturb the clamping of the diaphragm. The height of the annular rib 42 is greater than the depth of the annular groove 44 so that when a stack of the capsules is clamped together, the adjacent housing parts 10 and 12 only touch each other at the aligning annuli and thus eliminate any deflection of the housings of the several clamped together capsules, whereby there will be no change in the air gap between the several diaphragms and pole pieces due to the clamping.

One of the serious difficulties encountered in the design of pressure sensitive devices of the character herein shown is that the sensitivity changes with changes in the temperature of the device. By using "Invar" steel or other alloys having a very low thermal coefficient of expansion for the housing parts and the diaphragm, substantially all errors due to temperature variation are eliminated. Similarly by winding the coils with "Copel" wire which has a very low temperature coefficient of resistivity, the change in resistance with temperature change in the two coils of a unit is practically eliminated.

The magnetic circuits may be made indentical electrically by carefully annealing the housing parts after machining and then selecting matched sets.

In the operation of the capsule shown in Figs. 1 and 2, the permanent magnets 15 create a primary flux in the direction of the arrows 25. As shown the magnets 15 each generate a magnetic field which flows through housing parts 10 and 12 and joins at the outer edge of the diaphragm. The flux of these two magnetic fields adds together in the diaphragm as it flows radially inward toward the center pole pieces. When the flux reaches the center of the diaphragm it separates, part entering each pole piece, and continues its path as before. The amount of flux entering a given pole piece is determined by the air gap between the diaphragm and that pole piece. When the air gap between the diaphragm and one pole piece increases and correspondingly decreases the flux flowing therethrough, the air gap between the diaphragm and the other pole piece necessarily decreases and correspondingly increases the flux in said other pole piece.

It follows that variations in the pressure acting on one side of the diaphragm against a uniform reference pressure which is acting upon the other side of the diaphragm, will create movement of the diaphragm, which increases the flux in one magnetic circuit and decreases the flux in the other, corresponding electrical impulses being induced in the pickup coils 18 and 20.

Pickup coils 18 and 20 are preferably wound, one clockwise and the other anticlockwise, two of the terminals 30 and 34 being connected together to arrange the coils in series with the E. M. F. in one coil adding to that in the other. The other two leads 32 and 36 are then connected to an amplifier 46, the amplifier to an integrator 48, and the integrator to an oscillograph 50 as shown in Fig. 3.

It is noted that while the structure shown in Fig. 2 may be the preferred form, this device is still operative, though it may be somewhat less effective, when one only of the cup-shaped housing parts 10 or 12 are used and the diaphragm is welded or similarly secured to the rim of the cup, thereby enclosing one only of the permanent magnets 15 and one only of the pickup coils 18 or 20 in the single remaining chamber. The remaining pressure connection 26 or 28 may then bring in the pressure to be measured, and the outside of the diaphragm exposed to the ambient air or vice versa. Subcombination claims are accordingly presented to this operative portion of Fig. 2.

Figs. 4, 5 and 6 show a pressure sensitive plug 58 for picking up high frequency pulsating pressures such for instance as may occur in the combustion chambers of internal combustion engines. The lower body portion of the plug 58 is cylindrical at 60 and externally threaded at 62 for screwing into corresponding threads in the head of the engine. A polygonal portion 64 is provided for engagement by a wrench.

The lower body portion may be bored blind, leaving a relatively thick diaphragm 66 integral, or it may be bored through and a like diaphragm attached to the open end by welding or similar means. A series of circumferentially spaced axially extending channels 68 are provided in the bore 70, and a like series of radial passageways 72 communicate respectively with the channels.

The cylindrical portion 60 is internally threaded at 74 to receive an externally threaded part 76 of an upper body portion 78, which may be screwed into the lower body portion by engaging a spanner wrench in wrench opening 79 (see Fig. 4). An elongated pole piece 80 depends integrally from the lower end of the externally threaded part 76, the length of the pole piece being such as to leave an air gap 82 of predetermined width when the upper body part 78 is screwed into place. A central passageway 84 extends upward through the pole piece 80 and joins a lateral internally threaded passageway 86 which is threaded for connection to a coolant.

A tubular permanent magnet 88 surrounds the hollow pole piece 80, the magnetization of the magnet being such that it creates a flux flowing in the direction of the arrows 89. An A.-C. pickup coil 90 surrounds the tubular permanent magnet. Wires 92 from the ends of the pickup coil 90 extends upward through insulating sleeves 91 and through tubular terminals 30a and 32a which are fused into glass sleeves 38a which are in turn fused into flanged bushings 40a, the bushings 40a being soldered into the body portion 78 and the wires 92 being brought out through the tubular terminals 30a, 32a, into the chamber 94 and soldered at 96 substantially as described relative to Fig. 2. Wires may be extended as at 98 to join the tubular terminals 30a and 32a to a conventional terminal plug 100 which has a flange seated on a shoulder 102 at the upper end of the chamber 94 and soldered or similarly secured thereto. The operation of the pressure sensitive plug shown in Figs. 4 and 5 is as follows:

The assembled pressure sensitive plug is screwed into the opening in the cylinder of the engine to be tested or into a suitable opening in other devices to be tested. The supply of coolant, which should preferably be air or other fluid in order to minimize the cushioning effect on the diaphragm 66, should be connected to the lateral threaded opening 86, means, not shown, being provided to regulate its flow, temperature and pressure. When required, the cooling fluid may be reduced to a very low temperature by passing is through Dry Ice or other low temperature refrigerant. The flow of coolant should preferably be started as soon as the engine is started since otherwise the diaphragm 66 may become overheated.

The arrangement of the terminal plug 100 is such that when it is screwed into place the leads 98 of the pickup coil 90 may be connected to the associated equipment by conductors 32, 36, as shown in Fig. 3, the conductors being connected to the amplifier 46, the amplified output to the integrator 48, and its output to the oscillograph 50. With respect to the pressure sensitive plug, Fig. 5, the pressure of the cooling medium will be the reference pressure and that on the inside of the engine cylinder will be the pressure to be measured. By providing means to control the inflow of the coolant at 86 and suitably restricting the outflow at 72, the desired reference pressure may be maintained.

The permanent magnet 88 maintains the magnetic flux shown by the arrows which is varied by the displacement of the diaphragm 66 whereby a pulsating voltage is generated in the pickup coil, which may be amplified, integrated, and recorded substantially as hereinbefore explained and shown in Fig. 3.

When using the pressure sensitive capsules and plug, shown in Figs. 2 and 5, for recording very high frequency pulsations, there is a possibility that the response will not be linear at the higher frequencies because of the change of inductive reactance and eddy current losses in the capsule's pickup coils and magnetic circuits at these high frequencies. This nonlinearity may be eliminated by using the associate equipment shown in Fig. 6. The output of the pressure sensitive devices, Fig. 2 or Fig. 5, is taken by leads 104, 106, to an amplifier 108 which is a special wide band amplifier instead of a limited band amplifier 46 as used in Fig. 3. The signal then is passed through the integrator 110, then fed into a special amplifier 112 where the high frequency components of the signal are amplified more than the low frequency components by a predetermined amount which is adjustable, and which compensates for the possible nonlinearity of the device at these higher frequencies. The signal coming out of the special amplifier 112 is then a true representation of the high frequency pulsations being measured by the pressure sensitive devices of Fig. 2 or Fig. 5. The signal is then observed or recorded by the instrument 114 which may be a cathode ray or a recording oscillograph. The individual instruments of Fig. 6 are well known in the art.

Having described my invention, I claim:

1. In a pressure sensitive device, a housing part, open on one side, a diaphragm closing said open side so as to form a pressure tight chamber within said housing, a permanent magnet within said chamber coaxial with said diaphragm, an A.-C. pickup coil within said chamber coaxial with said magnet, a pressure connection communicating with said chamber and pressure sealed terminals for insulatedly bringing the coil ends from within to without the housing.

2. In a pressure sensitive capsule, a hollow housing, a diaphragm intermediate opposite walls of said housing dividing said hollow into two pressure tight chambers, two axially aligned permanent magnets one in each chamber, coaxial with said diaphragm, two A.-C. pickup coils one in each chamber coaxial with said magnets, a pressure connecting opening in each chamber, and pressure sealed terminal members adapted to insulatedly bring the coil ends out through the walls of said chambers.

3. A pressure sensitive capsule which comprises a hollow housing, a diaphragm medially disposed within the hollow of said housing dividing said hollow housing into two pressure tight chambers, pole pieces coaxial with said diaphragm extending from opposite walls of said housing toward, but not to said diaphragm, permanent magnets surrounding said pole pieces, A.-C. pickup coils surrounding said pole pieces, a pressure connection opening into each chamber, and pressure sealed terminal members insulatedly secured in the walls of said housing for bringing the coil ends out of the housing.

4. In a pressure sensitive electromagnetic device of the character described, a cup-shaped magnetic element having a centrally located pole piece of less height than the rim of said cup, a diaphragm secured pressure tight at its outer edge to said rim thereby being spaced slightly apart from the end of said pole piece, an annular permanent magnet within said cup and around said pole piece, an A.-C. pickup coil within said cup and around said pole piece, terminal means pressure sealed in the wall of said cup insulatedly bringing the A.-C. coil ends from within said cup, and a passageway for transferring pressure through the wall of said cup.

5. A pressure sensitive electromagnetic device which comprise a hollow housing consisting of two magnetic elements in the shape of cups having centrally located pole pieces of less height than the rims of said cups, a diaphragm secured pressure tight at its outer edge between said rims, thereby dividing said housing into two compartments wherein the center of said diaphragm is spaced apart from the ends of said pole pieces, a passageway for conducting a pressure to be measured into one of said compartments, a passageway for conducting a reference pressure into the other of said compartments, an annular permanent magnet within each magnetic element surrounding said pole pieces, an A.-C. pickup coil within each magnetic element surrounding said pole pieces, and pressure sealed terminal means, two in each cup for insulatedly bringing the ends of the pickup coils through the walls of the cup.

6. In a pressure sensitive electromagnetic device, a chambered housing, a diaphragm forming one wall of the chamber, a permanent magnet within said chamber coaxial with said diaphragm, an A.-C. pickup coil within said chamber coaxial with said magnet, a pressure connection communicating with said chamber, and pressure sealed electrically insulated terminal means conveying the coil ends through the wall of said chamber.

7. A pressure sensitive electromagnetic device which comprises a chambered housing, a diaphragm forming one wall of the chamber, a pole piece extending from the opposite wall of said chamber toward but not to said diaphragm, a permanent magnet surrounding said pole piece, an A.-C. pickup coil surrounding said pole piece, a pressure connection extending into said chamber, and pressure sealed electrically insulated terminal means for conveying the induced current pulsations from the A.-C. coils to the outside of the housing.

8. A pressure sensitive electromagnetic device which comprises a chambered housing, a diaphragm forming one wall of the chamber, a pole piece extending from the opposite wall of said chamber close to, but not against, said diaphragm, a permanent magnet surrounding said pole piece, an A.-C. pickup coil surrounding said magnet, pressure sealed electrically insulated terminal means for conveying the induced current pulsations from the A.-C. coils to the outside of the housing, and a passageway for supplying a fluid under pressure through said chamber.

9. A pressure sensitive electromagnetic plug which comprises a body containing a tubular chamber, a diaphragm closing one end of said chamber, a tubular pole piece extending from the opposite wall of said chamber near to, but not against, said diaphragm, a tubular permanent magnet surrounding said tubular pole piece, an A.-C. pickup coil surrounding said tubular magnet, pressure sealed terminals for insulatedly conducting the A.-C. current from the ends of the pickup coil to the outside of the housing, and a passageway for a gaseous coolant under pressure extending into said chamber, through said hollow pole piece against said diaphragm, then over said coil and out of said chamber.

10. A pressure sensitive electromagnetic plug adapted for measuring high frequency pulsating pressures in internal combustion engine cylinders and the like, said plug having a bore, an A.-C. pickup coil in said bore, there being an annular space between said coil and said bore, a diaphragm closing one end of said bore, means at the closed end for connection into the engine cylinder, a hollow permanent magnet within said coil, a hollow pole piece extending from the other end of said bore within said magnet close to but not against said diaphragm, pressure sealed terminals for insulatedly conducting the A.-C. current from the ends of the pickup coil to the outside of the plug, and a passageway extending into said plug, through said hollow pole piece to said diaphragm, then through said annular space and out through the wall of said plug.

11. A pressure sensitive electromagnetic plug adapted for measuring high frequency pulsating pressures in internal combustion engine cylinders and the like, said plug having an external thread at the lower end for screwing into an engine cylinder and a bore to receive an electrical winding, a diaphragm integrally closing the lower end of said bore, a pole piece concentrically depending from the upper end of said bore to a point near said diaphragm leaving an air gap between the end of said pole piece and said diaphragm, a passageway extending from said bore through said air gap upwardly through said pole piece and having means at the upper end for connection to a cooling system, a series of axially extending passageways in the wall of said bore, and a like series of radial passageways connecting the upper ends of said axial passageways to the atmosphere, a tubular permanent magnet in said bore and around said pole piece, a pickup winding in said bore and around said tubular magnet, pressure sealed terminals for insulatedly conducting the A.-C. current from the ends of the pickup coil to the outside of the plug, and a passageway extending laterally into said plug for the passage of fluid axially through said pole piece to said diaphragm, through said axially extending passageways and said radial passageways to the outside of said plug.

12. In a pressure sensitive capsule, a hollow housing, a diaphragm intermediate opposite walls of said housing, dividing said hollow housing into two pressure tight chambers, two axially aligned permanent magnets one in each chamber coaxial with said diaphragm, two A.-C. pickup coils one in each chamber coaxial with said magnets, pressure sealed terminal members adapted to insulatedly bring the coil ends out through the walls of said chamber, and a pressure connecting opening in one of said chambers, the other of said chambers being evacuated and sealed, whereby the absolute pressure will be measured.

13. The device of claim 1 wherein said pressure tight chamber is evacuated and sealed.

JAMES CLARK.

REFERENCES CITED

The following references are of record in the file of this patent:

UNITED STATES PATENTS

| Number | Name | Date |
|---|---|---|
| 2,319,219 | Draper et al. | May 18, 1943 |
| 2,396,703 | Kamler et al. | May 19, 1946 |
| 2,416,614 | Crossley et al. | Feb. 25, 1947 |
| 2,448,322 | Piety | Aug. 31, 1948 |